(12) United States Patent
Aoki et al.

(10) Patent No.: US 11,121,363 B2
(45) Date of Patent: Sep. 14, 2021

(54) POSITIVE ELECTRODE ACTIVE MATERIAL FOR NON-AQUEOUS ELECTROLYTE SECONDARY BATTERIES, AND NON-AQUEOUS ELECTROLYTE SECONDARY BATTERY

(71) Applicant: Panasonic Intellectual Property Management Co., Ltd., Osaka (JP)

(72) Inventors: Yoshinori Aoki, Hyogo (JP); Motoharu Saitou, Hyogo (JP); Takeshi Ogasawara, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 35 days.

(21) Appl. No.: 16/326,560

(22) PCT Filed: Aug. 22, 2017

(86) PCT No.: PCT/JP2017/029845
§ 371 (c)(1),
(2) Date: Feb. 19, 2019

(87) PCT Pub. No.: WO2018/043190
PCT Pub. Date: Mar. 8, 2018

(65) Prior Publication Data
US 2019/0190018 A1     Jun. 20, 2019

(30) Foreign Application Priority Data

Aug. 31, 2016   (JP) .............................. JP2016-169924

(51) Int. Cl.
*H01M 4/36*     (2006.01)
*H01M 4/525*    (2010.01)
(Continued)

(52) U.S. Cl.
CPC ........... *H01M 4/366* (2013.01); *H01M 4/364* (2013.01); *H01M 4/525* (2013.01);
(Continued)

(58) Field of Classification Search
CPC ...... H01M 4/366; H01M 4/364; H01M 4/525; H01M 4/5825
See application file for complete search history.

(56) References Cited

U.S. PATENT DOCUMENTS

| | | |
|---|---|---|
| 5,989,744 A | 11/1999 | Yamaura |
| 2010/0209763 A1 | 8/2010 | Okamura et al. |

(Continued)

FOREIGN PATENT DOCUMENTS

| | | |
|---|---|---|
| CN | 102315447 A | 1/2012 |
| CN | 104821393 A | 8/2015 |

(Continued)

OTHER PUBLICATIONS

JP 2013-137947. Jul. 11, 2013. English machine translation by EPO. (Year: 2013).*
(Continued)

*Primary Examiner* — James Lee
(74) *Attorney, Agent, or Firm* — Westerman, Hattori, Daniels & Adrian, LLP

(57) ABSTRACT

The present invention is directed to a positive electrode active material for non-aqueous electrolyte secondary batteries that can reduce direct-current resistance while it contains a nickel-containing lithium transition metal oxide with a high Ni content. The positive electrode active material contains lithium borate and a nickel-containing lithium transition metal oxide (Ni≥80 mol %) having a layered structure. The nickel-containing lithium transition metal oxide is composed of secondary particles formed by aggregation of primary particles. Lithium borate is attached to the (Continued)

surfaces of the primary particles. The proportion b of lithium borate with respect to the total molar amount of metal elements other than lithium in the nickel-containing lithium transition metal oxide is in the range of 0 mol %<b≤0.5 mol % on a boron element basis. The porosity h of the secondary particles is in the range of 2%<h<6%.

6 Claims, 1 Drawing Sheet

(51) Int. Cl.
    *H01M 4/58*     (2010.01)
    *H01M 10/0525*     (2010.01)
    *H01M 4/02*     (2006.01)

(52) U.S. Cl.
    CPC ..... *H01M 4/5825* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2012/0009474 A1 | 1/2012 | Yanagihara et al. | |
| 2012/0231327 A1 | 9/2012 | Hiratsuka | |
| 2015/0221934 A1 | 8/2015 | Hiratsuka et al. | |
| 2015/0380737 A1 | 12/2015 | Kawasato et al. | |
| 2016/0301079 A1 | 10/2016 | Kokubu et al. | |
| 2016/0372748 A1 | 12/2016 | Nakayama et al. | |
| 2018/0316010 A1 | 11/2018 | Nakayama et al. | |

FOREIGN PATENT DOCUMENTS

| | | |
|---|---|---|
| CN | 105247711 A | 1/2016 |
| CN | 105794023 A | 7/2016 |
| JP | 10-50314 A | 2/1998 |
| JP | 2002-42811 A | 2/2002 |
| JP | 2004-335278 A | 11/2004 |
| JP | 2009-146739 A | 7/2009 |
| JP | 2013-73833 A | 4/2013 |
| JP | 2013-137947 A | 7/2013 |
| JP | 2016-12500 A | 1/2016 |
| JP | 5843046 B2 | 1/2016 |
| JP | 2016-026981 A | 2/2016 |
| KR | 101286762 B1 | 7/2013 |
| WO | 2009/141991 A1 | 11/2009 |
| WO | 2011/111377 A1 | 9/2011 |
| WO | 2015/008582 A1 | 1/2015 |
| WO | 2015/079664 A1 | 6/2015 |

OTHER PUBLICATIONS

JP 2013-073833. Apr. 22, 2013. English machine translation by EPO. (Year: 2013).*
International Search Report dated Nov. 28, 2017, issued in counterpart International Application No. PCT/JP2017/029845 (2 pages).
English Translation of Search Report dated May 25, 2021, issued in counterpart CN Application No. 201780052519.6. (2 pages).

* cited by examiner

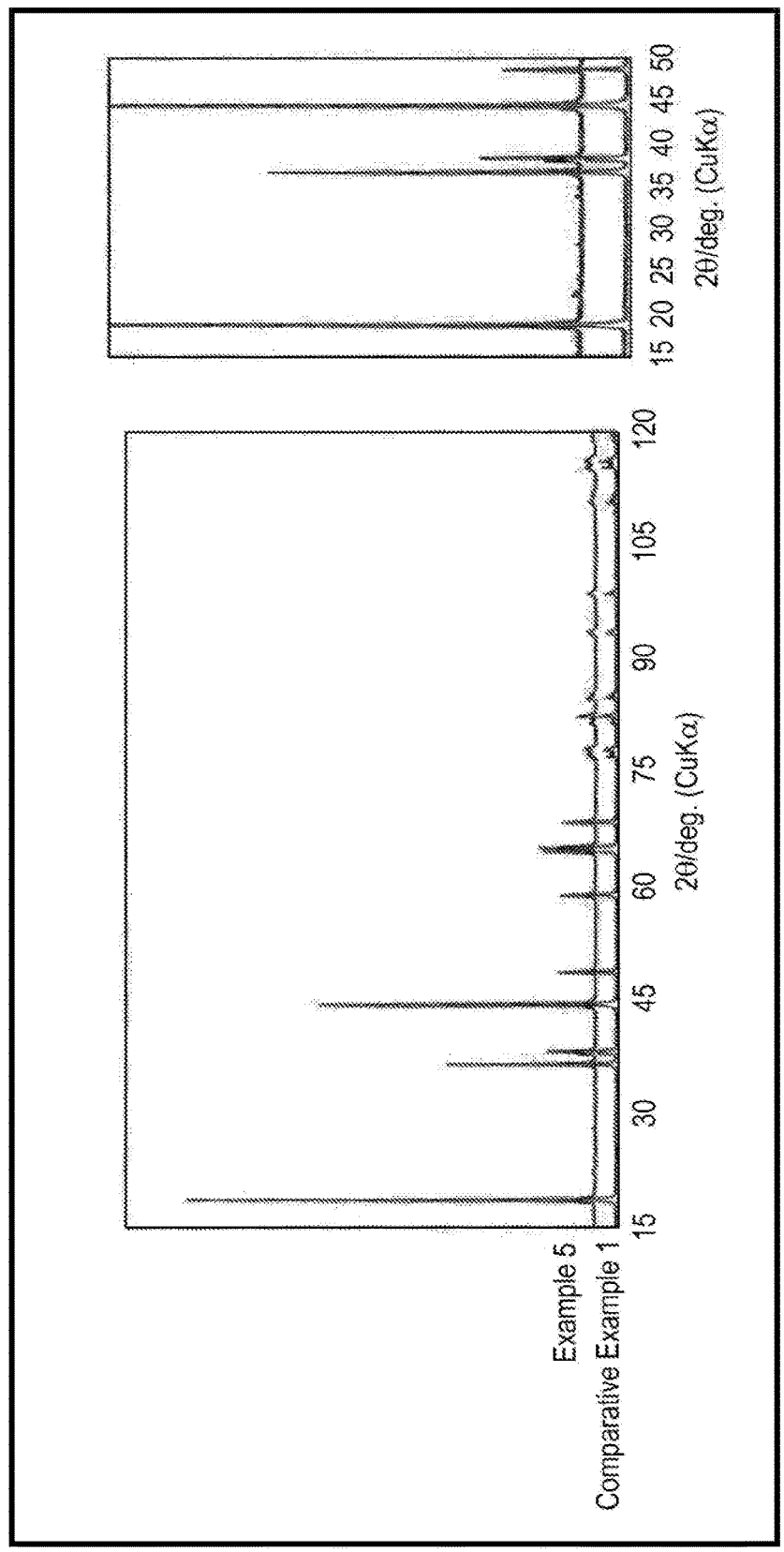

POSITIVE ELECTRODE ACTIVE MATERIAL FOR NON-AQUEOUS ELECTROLYTE SECONDARY BATTERIES, AND NON-AQUEOUS ELECTROLYTE SECONDARY BATTERY

TECHNICAL FIELD

The present disclosure relates to a positive electrode active material for non-aqueous electrolyte secondary batteries and to a non-aqueous electrolyte secondary battery.

BACKGROUND ART

A nickel-containing lithium transition metal oxide (e.g., $LiNiO_2$), which is one of positive electrode active materials for lithium-ion secondary batteries, is advantageous in that it has a higher capacity than a cobalt-containing lithium transition metal oxide (e.g., $LiCoO_2$) and is stably available because nickel is cheaper than cobalt. Thus, a nickel-containing lithium transition metal oxide is expected as a next-generation positive electrode material.

Patent Document 1 discloses that, in the synthesis of lithium nickel oxide, the addition of a firing aid to a material to be fired promotes the crystal growth of lithium nickel oxide at a temperature lower than a firing temperature required for achieving desired crystal growth of lithium nickel oxide to accelerate substitution introduction of an element involved in structural stability into the crystal and to prevent or reduce crystal distortion and oxygen deficiency during synthesis, which provides a lithium-ion secondary battery having good cycle characteristics.

CITATION LIST

Patent Document

Patent Document 1: International Publication No. WO 2011/111377

SUMMARY OF INVENTION

By the way, when a nickel-containing lithium transition metal oxide is used as a positive electrode active material, there is a problem in that, as the nickel content increases, the charge/discharge capacity increases but the direct-current resistance increases. The direct-current resistance may be high particularly in a low SOC region (e.g., a SOC of 30% or less).

The present disclosure is thus directed to a positive electrode active material for non-aqueous electrolyte secondary batteries that can reduce direct-current resistance while it contains a nickel-containing lithium transition metal oxide with a high Ni content.

A positive electrode active material for non-aqueous electrolyte secondary batteries in one aspect of the present disclosure contains lithium borate and a nickel-containing lithium transition metal oxide (Ni≥80 mol %) having a layered structure. The nickel-containing lithium transition metal oxide is composed of secondary particles formed by aggregation of primary particles. Lithium borate is attached to the surfaces of the primary particles. The proportion b of lithium borate with respect to the total molar amount of metal elements other than lithium in the nickel-containing lithium transition metal oxide is in the range of 0 mol %<b≤0.5 mol % on a boron element basis. The porosity h of the secondary particles is in the range of 2%<h<6%.

The positive electrode active material for non-aqueous electrolyte secondary batteries in one aspect of the present disclosure can reduce direct-current resistance while it contains a nickel-containing lithium transition metal oxide with a high Ni content.

BRIEF DESCRIPTION OF DRAWINGS

FIG. 1 illustrates X-ray diffraction patterns of positive electrode active materials of Example 5 and Comparative Example 1, and enlarged X-ray diffraction patterns from 15° to 50°.

DESCRIPTION OF EMBODIMENTS

A positive electrode active material for non-aqueous electrolyte secondary batteries in one aspect of the present disclosure contains lithium borate and a nickel-containing lithium transition metal oxide (Ni≥80 mol %) having a layered structure. The nickel-containing lithium transition metal oxide is composed of secondary particles formed by aggregation of primary particles. Lithium borate is attached to the surfaces of the primary particles. The proportion b of lithium borate with respect to the total molar amount of metal elements other than lithium in the nickel-containing lithium transition metal oxide is in the range of 0 mol %<b≤0.5 mol % on a boron element basis. The porosity h of the secondary particles is in the range of 2%<h<6%. The foregoing configuration enables reduction in direct-current resistance. The mechanism for this is not fully understood but may be considered as follows.

As described above, the direct-current resistance of the nickel-containing lithium transition metal oxide increases with increasing nickel content. This may be because increasing the Ni content reduces the diffusibility of lithium ions due to changes in crystal structure associated with charging and discharging, particle breakage associated with expansion and contraction of a crystal lattice, and the like. Here, the particle breakage and the like may be prevented or reduced by attaching a predetermined amount of lithium borate to the surfaces of primary particles of the nickel-containing lithium transition metal oxide. This may suppress a decrease in diffusibility of lithium ions. Note that, if the porosity h of the secondary particles of the nickel-containing lithium transition metal oxide is 2% or less, the diffusibility of lithium ions may be low due to a decrease in the permeability of an electrolyte into the secondary particles. If the porosity h of the secondary particles is 6% or more, the conductivity may be low due to deteriorated adhesion between the primary particles that form the secondary particles. For this, in the case where the effect of adding lithium borate to the nickel-containing lithium transition metal oxide (Ni≥80 mol %) is exerted but the porosity of the secondary particles is 2% or less or 6% or more, the direct-current resistance may not be reduced as a result. Therefore, a positive electrode active material containing a nickel-containing lithium transition metal oxide with a high Ni content can reduce direct-current resistance when the positive electrode active material meets both of the following requirements: a predetermined amount of lithium borate is attached to the surfaces of the primary particles; and the porosity h of the secondary particles is 2%<h<6%, like the positive electrode active material for non-aqueous electrolyte secondary batteries in one aspect of the present disclosure.

Hereinafter, the materials of the positive electrode active material for non-aqueous electrolyte secondary batteries in one aspect of the present disclosure will be described in detail.

The positive electrode active material for non-aqueous electrolyte secondary batteries contains a nickel-containing lithium transition metal oxide (Ni≥80 mol %) having a layered structure. The nickel-containing lithium transition metal oxide (Ni≥80 mol %) means the lithium transition metal oxide in which the proportion of nickel with inspect to the total molar amount of metal elements other than lithium is 80 mol % or more. Hereinafter, the nickel-containing lithium transition metal oxide (Ni≥80 mol %) may be referred to as a nickel-excess lithium transition metal oxide.

Examples of the layered structure of the nickel-excess lithium transition metal oxide include a layered structure belonging to space group R−3m, and a layered structure belonging to space group C2/m. Among these, a layered structure belonging to space group R−3m is preferred in terms of stability in crystal structure, high capacity, and the like.

The nickel-excess lithium transition metal oxide is any nickel-containing lithium transition metal oxide in which the proportion of nickel is 80 mol % or more as described above, but preferably, for example, a nickel-containing lithium transition metal oxide represented by the following composition formula.

$$Li_xNi_yCo_\alpha M_\beta O_{2-\gamma} \quad (1)$$

In the formula, x, y, $\alpha$, $\beta$, and $\gamma$ satisfy $0.95<x<1.05$, $0.80 \leq y<1$, $0<\alpha<0.15$, $0<\beta<0.05$, $y+\alpha+\beta=1$, and $0 \leq \gamma<0.05$. In the formula, M is an added metal element other than Ni and Co present in the crystal structure. The added metal element is, for example, at least one element selected from Al, Mg, Si, Ge, Sn, Mo, Ti, W, Nb, Zr, Cr, Mn, and Fe. In the composition formula (1), the molar ratio of each element is expressed provided that the total amount of Ni, Co, and M is 1 mol, that is, $y+\alpha+\beta=1$.

In the composition formula (1), x represents the amount (molar ratio) of lithium (Li) with respect to the total amount of Ni, Co, and M. To improve the charge/discharge capacity of non-aqueous electrolyte secondary batteries, the amount of lithium is preferably in the range of $0.95<x<1.05$, and more preferably in the range of $0.98<x \leq 1$.

In the composition formula (1), y represents the amount (molar ratio) of nickel (Ni) with respect to the total amount of Ni, Co, and M. To improve the charge/discharge capacity of non-aqueous electrolyte secondary batteries, the amount of nickel is preferably in the range of $0.80 \leq y<1$, and more preferably in the range of $0.85<y<1$.

In the composition formula (1), $\alpha$ represents the amount (molar ratio) of cobalt (Co) with respect to the total amount of Ni, Co, and M. The amount of cobalt in the range of $0<\alpha$ results in non-aqueous electrolyte secondary batteries having high durability. The amount of cobalt in the range of $\alpha<0.15$ results in non-aqueous electrolyte secondary batteries having a high charge/discharge capacity. The amount of cobalt is more preferably in the range of $0.03<\alpha<0.12$.

In the composition formula (1), $\beta$ represents the amount (molar ratio) of M with respect to the total amount of Ni, Co, and M.

The amount of M in the range of $0<\beta$ results in non-aqueous electrolyte secondary batteries having high durability. The amount of M in the range of $\beta<0.05$ results in non-aqueous electrolyte secondary batteries having a high charge/discharge capacity. The amount of M is more preferably in the range of $0.005<\beta<0.05$.

In the composition formula (1), "$2-\gamma$" represents the amount (molar ratio) of an oxygen atom (O) with respect to the total amount of Ni, Co, and M. Here, $\gamma$ represents the amount of oxygen deficiency. As the $\gamma$-value increase, the amount of divalent Ni may increase accordingly to form "halite", that is, to convert the layered structure into a halite structure, reducing the charge/discharge capacity. To improve the charge/discharge capacity, the promoting factor $\gamma$ for formation of halite is preferably in the range of $0 \leq \gamma<0.05$.

Here, the nickel-containing lithium transition metal oxide may contain metal elements other than Li, Ni, Co, and M unless an object of the present disclosure is impaired.

The positive electrode active material for non-aqueous electrolyte secondary batteries contains lithium borate attached to the surfaces of the primary particles of the nickel-excess lithium transition metal oxide. The proportion b of lithium borate with respect to the total molar amount of metal elements other than lithium in the nickel-excess lithium transition metal oxide is, on a boron element basis, in the range of 0 mol %<b≤0.5 mol %, and preferably in the range of 0.3 mol %≤b≤0.5 mol %. As described above, the attachment of lithium borate to the surfaces of the primary particles can improve lithium-ion conductivity and can reduce direct-current resistance. If the amount of lithium borate attached to the surfaces of the primary particles is too large, that is, b is more than 0.5 mol %, for example, the battery capacity may be low.

Examples of lithium borate include $Li_3BO_3$, $Li_2B_4O_7$, and $LiBO_2$. Among these, $Li_3BO_3$ is preferred in terms of the attachment to the primary particles, the diffusibility of lithium ions, and the like.

The amount of elements that constitute the positive electrode active material can be determined with, for example, an inductively coupled plasma-atomic emission spectrometer (ICP-AES), an electron probe microanalyzer (EPMA), or an energy dispersive X-ray analyzer (EDX).

[Porosity and Primary Particle Size]

The porosity h of the secondary particles of the nickel-excess lithium transition metal oxide is preferably in the range of 2%<h<6%, and more preferably in the range of 4.3<h<5.8. As described above, if the porosity is 2% or less, the diffusion of lithium may be reduced due to low permeability of the electrolyte into the secondary particles. If the porosity is 6% or more, the electron conductivity may be reduced due to a problem associated with the adhesion between the primary particles. After all, when the porosity is in the above-described range, and the predetermined amount of lithium borate is attached to the surfaces of the primary particles, the direct-current resistance can be reduced.

The primary particle size R of the nickel-excess lithium transition metal oxide is preferably in the range of 400 nm<R<1300 nm. If the primary particle size R is 400 nm or less, the surface area is large, and the reactivity with the electrolyte is high, which may cause a case where the decomposition products of the electrolyte tend to deposit and affect a rise in direct-current resistance. If the primary particle size is 1300 nm or more, the surface area is small, and the area involved in intercalation and deintercalation of lithium ions is small, which may affect direct-current resistance.

The methods for determining the porosity and the primary particle size are as described below. A nickel-excess lithium transition metal oxide is mixed with a thermosetting resin, and the resin is cured, so that the nickel-excess lithium transition metal oxide is embedded in the resin. A rough cross section is formed by using mechanical polishing and the like in combination, and the cross section is finished by using a cross section polisher (CP) method. The polished surface is observed with SIM (scanning ion microscopy) under a condition of a magnification of 1,000 to 10,000 times. From the obtained image, the primary particle size and the porosity of the nickel-excess lithium transition metal oxide are determined by using analysis software Image-Pro PLUS. Specifically, the color corresponding to the pore portions of the secondary particles and the color corresponding portions other than the pore portions of the secondary particles are respectively displayed as white and black or as black and white. The area of each color is obtained, and the porosity is obtained from the ratio between the areas.

[Compression Breaking Strength]

The compression breaking strength K of the secondary particles of the nickel-excess lithium transition metal oxide is preferably in the range of 50 MPa<K<150 MPa, and more preferably in the range of 70 MPa<K<120 MPa. If the compression breaking strength K is 50 MPa or less, the cycle characteristics may be deteriorated due to breakage of the secondary particles associated with charge/discharge cycles. If the compression breaking strength K is 150 MPa or more, the filling properties may be deteriorated, which may lead to a battery having a low volume capacity density.

The compression breaking strength is measured by using a micro compression tester ("MCT-W201" available from Shimadzu Corporation) under the measurement conditions described below. Specifically, the amount of deformation of one sample particle and the load on the sample particle upon application of the load to the sample particle at the loading rate described below are measured. The compression breaking strength is then calculated by substituting, into the following formula (1), the load (N) at a time when the sample particle deforms to the breaking point (the point at which displacement begins to increase rapidly), and the particle size (the particle size determined with a CCD camera) of the sample particle before deformation.

$$\text{Compression breaking strength (MPa)} = 2.8 \times \text{load}(N) / \{\pi \times (\text{particle size (mm)})^2\} \quad (1)$$

<Conditions for Measuring Compression Strength>
Test temperature: normal temperature (25° C.)
Upper pressure indenter: flat indenter 50 μm in diameter (material: diamond)
Lower pressure plate: SKS plate
Measurement mode: compression test
Test load: minimum 10 mN, maximum 50 mN
Loading rate: minimum 0.178 mN/s, minimum 0.221 mN/s
Displacement full scale: 10 μm

[X-Ray Diffraction Pattern]

The X-ray diffraction pattern of the nickel-excess lithium transition metal oxide is obtained by analysis based on powder X-ray diffractometry under the following conditions using an X-ray diffractometer (available from Rigaku Corporation, product name "RINT-TTR", radiation source Cu-Kα).
Measurement range: 15° to 120°
Scanning speed: 4°/min
Rietveld analysis: using PDXL2 (Rigaku Corporation)
Analysis range: 30° to 120°
Background: B-spline:
Profile function: split pseudo-Voigt function
Constraint Conditions: Li(3a)+Ni(3a)=1
    Ni(3a)+Ni(3b)=y
ICSD No.: 98-009-4814

The crystallite size s of the nickel-excess lithium transition metal oxide, which is calculated in accordance with the Scherrer equation from the half-width of the diffraction peak corresponding to the (104) face in the X-ray diffraction pattern obtained by the foregoing X-ray diffraction, is preferably 300 Å≤s≤700 Å. The Scherrer equation is represented by the following formula (2).

$$D = K\lambda / B \cos\theta \quad (2)$$

In the formula (2), D is the crystallite size, λ is the X-ray wavelength, B is the full width at half maximum of the diffraction peak corresponding to the (104) face, θ is the diffraction angle (rad), and K is the Scherrer constant. In this embodiment, K is 0.9.

If the crystallite size s of the nickel-excess lithium transition metal oxide is less than 300 Å, low crystallinity may lead to low durability. If the crystallite size s of the nickel-excess lithium transition metal oxide is more than 700 Å, the rate characteristics may be deteriorated.

For the nickel-excess lithium transition, metal oxide, the amount m of the transition petal present at the 3a site (lithium site) in the crystal structure obtained from the Rietveld analysis results of the X-ray diffraction pattern obtained by the foregoing X-ray diffraction is preferably in the range of 0 mol≤m<2 mol % with respect to the total molar amount of transition metals. If the amount m of the transition metal present at the 3a site (lithium site) in the crystal structure is more than 2 mol %, the diffusibility of lithium ions may be reduced due to distortion of the crystal structure, resulting in deteriorated battery characteristics.

For the nickel-excess lithium transition metal oxide, the lattice constant a indicating the a-axis length of the crystal structure obtained from the analysis results of the X-ray diffraction pattern obtained by the foregoing X-ray diffraction is preferably in the range of 2.867 Å<a<2.873 Å, and the lattice constant c indicating the c-axis length is preferably in the range of 14.17 Å<c<14.19 Å. If the lattice constant a is 2.867 Å or less, the structure is unstable due to small interatomic distances, which may result in deteriorated cycle characteristics. If the lattice constant a is 2.873 Å or more, the load characteristics may be deteriorated. If the lattice, constant c is 14.17 Å or less, the structure is unstable due to small, interatomic distances, which may result in deteriorated cycle characteristics. If the lattice constant c is 14.19 Å or more, the amount of lithium in the structure is small, which may result in a low discharge capacity.

An example method for producing a positive electrode active material according to this embodiment will be described below.

One example method is a synthesis method that involves mixing a Li-containing compound (Li source), a Ni-containing metal compound (Ni-containing metal source), and a B-containing compound (B source) at a mixing ratio based on the intended nickel-containing lithium transition metal oxide, and firing the mixture.

Another example method may involve synthesizing a nickel-containing lithium transition metal oxide by using a Li source and a Ni-containing metal source, and then adding lithium borate to the nickel-containing lithium transition metal oxide. In this method, however, it is difficult to control the porosity of the secondary particles, the primary particle size, and the like in the above-described ranges. Therefore, the method in which a B source is added in a step of synthesising a nickel-containing lithium transition metal oxide is more preferred because the porosity of the secondary particles, the primary particle size, and the like can be controlled in the above-described ranges.

The Li source is preferably added such that the molar ratio L of Li with respect to the metals other than Li is in the range of $1.03<L<1.18$. The molar ratio L of Li is more preferably $1.04 \leq L \leq 1.15$. If the molar ratio L of Li is 1.03 or less and 1.18 or more, the porosity of the secondary particles and the primary particle size may be out of the above-described ranges.

The method for firing the material mixture is preferably two-step firing. Preferably, the temperature of first-step firing is mainly set to a temperature at which boron is dissolved in synthesis of a nickel-containing lithium transition metal oxide. The temperature of first-step firing is in the range of 650° C. to 730° C. Preferably, the temperature of second-step firing is mainly set to a temperature at which dissolved boron is deposited on the surfaces of the primary particles of the nickel-containing lithium transition metal oxide. The temperature of second-step firing is in the range of 750° C. to 850° C. The firing time is 3 to 20 hours. The material mixture is preferably fired in oxygen current.

Under the foregoing synthesis conditions, the porosity of the secondary particles, the primary particle size, and the like can be controlled in the above-described ranges, and other parameters, such as compression breaking strength and crystallite size, can also be controlled in desired ranges.

For the positive electrode active material produced under the foregoing synthesis conditions, part of boron may remain dissolved in the nickel-containing lithium transition metal oxide in the second-step firing in which dissolved boron is deposited on the surfaces of the primary particles of the nickel-containing lithium transition metal oxide.

The proportion of the nickel-excess lithium transition metal oxide having lithium borate with respect to the total amount of the positive electrode active material is preferably 90 mass % or more, and more preferably is 99 mass % or more.

The positive electrode active material for non-aqueous electrolyte secondary batteries according to this embodiment may contain other lithium transition metal oxide in addition to the nickel-excess lithium transition metal oxide having lithium borate. Examples of other lithium transition metal oxide include a lithium transition metal oxide having a Ni content of 0 mol % or more and less than 80 mol %, and a boron-containing oxide formed by addition of boron to the lithium transition metal oxide.

A non-aqueous electrolyte secondary battery including the positive electrode active material for non-aqueous electrolyte secondary batteries according to this embodiment will be described below.

The non-aqueous electrolyte secondary battery, which is an example of the embodiment, includes at positive electrode, a negative electrode, and a non-aqueous electrolyte. A separator is preferably interposed between the positive electrode and the negative electrode-. Specifically, the non-aqueous electrolyte secondary battery has a structure in which the non-aqueous electrolyte and a wound-type electrode body formed by winding the positive electrode and the negative electrode with the separator interposed therebetween are placed in an outer body. Alternatively, instead of a wound-type electrode body, other type of electrode body, such as a stacked-type electrode body formed by stacking a positive electrode and a negative electrode with a separator interposed therebetween, may be used. The type of non-aqueous electrolyte secondary battery is not limited and may be, for example, a cylindrical, prismatic, coin-type, button-type, or laminate-type secondary battery.

[Positive Electrode]

The positive electrode includes, for example, a positive electrode current collector, such as a metal foil, and a positive electrode active material layer formed on the positive electrode current collector. The positive electrode current collector may be, for example, a foil made of a metal, such as aluminum, stable in the potential range of the positive electrode or a film having the surface layer made of the metal.

The positive electrode active material layer contains the above-described positive electrode active material for non-aqueous electrolyte secondary batteries. The positive electrode active material is as described above, and the description thereof is omitted. The positive electrode active material layer preferably contains a conductive material and a binder in addition to the positive electrode active material.

Examples opf the conductive material include carbon materials, such as carbon black, acetylene black, Ketjenblack, and graphite. These conductive materials may be used alone or in combination of two or more. The amount of the conductive material is preferably 0.1 to 30 mass %, more preferably 0.1 to 20 mass %, and still more preferably 0.1 to 10 mass %, with respect to the total mass of the positive electrode active material layer.

Examples of the binder include polytetrafluoroethylene (PTFE), polyvinylidene fluoride, polyvinyl acetate, polymethacrylate, polyacrylate, polyacrylonitrile, polyvinyl alcohol, and a mixture of two or more of these. The binder may be used together with a thickener, such as carboxymethyl cellulose (CMC) and polyethylene oxide (PEO). These binders may be used alone or in combination of two or more. The amount of the binder is preferably 0.1 to 30 mass %, more preferably 0.1 to 20 mass %, and still more preferably 0.1 to 10 mass %, with respect to the total mass of the positive electrode active material layer.

[Negative Electrode]

The negative electrode includes, for example, a negative electrode current collector, such as a metal foil, and a negative electrode active material layer formed on the negative electrode current collector. The negative electrode current collector may be, for example, a foil made of a metal, such as aluminum or copper, stable in the potential range of the negative electrode or a film having the surface layer made of the metal. The negative electrode active material layer preferably contains a binder in addition to a negative electrode active material that can intercalate and deintercalate lithium ions. The negative electrode active material layer may contain a conductive material as needed.

Examples of the negative electrode active material include natural graphite, synthetic graphite, lithium, silicon, carbon, tin, germanium, aluminum, lead, indium, gallium, lithium alloys, carbon having previously intercalated lithium, silicon, alloys of these, and mixtures of these. The binder may be, for example, PTFE as in the positive electrode, but preferably styrene-butadiene copolymer (SBR) or a modified product, thereof. The binder may be used together with a thickener, such as CMC.

[Non-Aqueous Electrolyte]

The non-aqueous electrolyte contains a non-aqueous solvent and an electrolyte salt dissolved in the non-aqueous solvent. The non-aqueous electrolyte is not limited to a liquid electrolyte (non-aqueous electrolyte solution), and may be a solid electrolyte formed by using a gel polymer or the like. Examples of the non-aqueous solvent include esters, ethers, nitriles such as acetonitrile, and amides such as dimethylformamide, and solvent mixtures of two or more of these.

Examples of esters include cyclic carbonates, such as ethylene carbonate, propylene carbonate, and butylene carbonate; chain carbonates, such as dimethyl carbonate, methyl ethyl carbonate, diethyl carbonate, methyl propyl carbonate, ethyl propyl carbonate, and methyl isopropyl carbonate; and carboxylic acid esters, such as methyl acetate, ethyl acetate, propyl acetate, methyl propionate, ethyl propionate, and γ-butyrolactone.

Examples of ethers include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, crown ether; and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, methyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

The non-aqueous solvent preferably contains a halogenated product formed by substituting hydrogen atoms of the foregoing solvent with halogen atoms such as a fluorine atom. In particular, the halogenated product is preferably a fluorinated cyclic carbonate or a fluorinated chain carbonate, and more preferably a mixture of these carbonates. The use of the halogenated product allows formation of a suitable protective coating film on the positive electrode as well as the negative electrode to improve cycle characteristics. Examples of suitable fluorinated cyclic carbonates include 4-fluoroethylene carbonate, 4,5-difluoroethylene carbonate, 4,4-difluoroethylene carbonate, 4,4,5-trifluoroethylene carbonate, and 4,4,5,5-tetrafluoroethylene carbonate. Examples of suitable fluorinated chain esters include ethyl 2,2,2-trifluoroacetate, methyl 3,3,3-trifluoropropionate, and methyl pentafluoropropionate.

The electrolyte salt is preferably a lithium salt. Examples of the lithium salt include $LiPF_6$, $LiBF_4$, $LiAsF_6$, $LiClO_4$, $LiCF_3SO_3$, $LiN(FSO_2)_2$, $LiN(C_lF_{2l+1}SO_2)(C_mF_{2m+1}SO_2)$ (1 and m are integers of 1 or more), $LiC(C_pF_{2p+1}SO_2)(C_qF_{2q+1}SO_2)(C_rF_{2r+1}SO_2)$ (p, q, and r are integers of 1 or more), $Li[B(C_2O_4)_2]$ (lithium bis(oxalato)borate (LiBOB)), $Li[B(C_2O_4)F_2]$, $Li[P(C_2O_4)F_4]$, $Li[P(C_2O_4)_2F_2]$, and $LiPO_2F_2$. These lithium salts may be used alone or in combination of two or more.

[Separator]

The separator is, for example, an insulating porous sheet having ion permeability. Specific examples of the porous sheet include a microporous thin film, a woven fabric, and a non-woven fabric. Examples of suitable materials of the separator include olefinic resins, such as polyethylene and polypropylene, and cellulose. The separator may be a stacked body having a cellulose fiber layer and a thermoplastic resin fiber layer made of an olefinic resin or the like.

EXAMPLES

The present disclosure will be described below in more by way of Examples, but the present disclosure is not limited to Examples described below.

Example 1

[Preparation of Positive Electrode Active Material (Nickel-Excess Lithium Transition Metal Oxide)]

A nickel-cobalt-aluminum composite hydroxide represented by the composition formula of $Ni_{0.88}Co_{0.09}Al_{0.03}(OH)_2$ was obtained by coprecipitation and then heated at 500° C. to prepare a composite oxide. Next, LiOH, the composite oxide, and $H_3BO_3$ were mixed such that the molar ratio of Li, all transition metals (Ni, Co, and Al), and B was 1.04:1:0.01. Next, the mixture was subjected to two-step firing in oxygen current involving firing at 670° C. for 1 hour and firing at 760° C. for 3 hours, and then washed with water to remove impurities. The composition of the nickel-excess lithium transition metal oxide obtained as described above was determined by using an ICP emission spectrophotometer (available from Thermo Fisher Scientific Inc., product name "iCAP 6300"). As a result, it was found that the nickel-excess lithium transition metal oxide that is represented by the composition formula of $Li_{0.95}Ni_{0.88}Co_{0.09}Al_{0.03}O_2$ and to which 0.1 mol % of lithium borate was attached was produced. This lithium transition metal oxide was provided as a positive electrode active material of Example 1.

[Production of Positive Electrode]

The following materials were mixed: 91 parts by mass of the positive electrode active material, 7 parts by mass of acetylene black, which was a conductive material, and 2 parts by mass of polyvinylidene fluoride, which was a binder. The mixture was kneaded by using a kneader (T. K. Hivis Mix, available from PRIMIX Corporation) to prepare a positive electrode mixture slurry. Next, a positive electrode mixture slurry was applied to an aluminum foil 15 μm in thickness, and the coating film was dried to form a positive electrode active material layer on the aluminum foil. This was provided as a positive electrode.

[Preparation of Non-Aqueous Electrolyte]

Ethylene carbonate (EC), methyl ethyl carbonate (MEC), and dimethyl carbonate (DMC) were mixed at a volume ratio of 3:3:4. In the solvent mixture, 1.2 mol/L of lithium hexafluorophosphate ($LiPF_6$) was dissolved to prepare a non-aqueous electrolyte.

[Production of Test Cell]

The positive electrode and a negative electrode formed of a lithium metal foil were stacked such that the positive electrode and the negative electrode faced each other with a separator interposed therebetween. The stacked product was wound to prepare a wound electrode body. Next, the wound electrode body and the non-aqueous electrolyte were inserted into an outer body made of aluminum to produce a non-aqueous electrolyte secondary battery (test cell A1).

Example 2

A nickel-excess lithium transition metal oxide that is represented by the composition formula of $Li_{0.96}Ni_{0.88}Co_{0.09}Al_{0.03}O_2$ and to which 0.3 mol % of lithium borate was attached was produced in the same manner as in Example 1 except that LiOH, the composite oxide, and $H_3BO_3$ were mixed in preparation of a positive electrode active material such that the molar ratio of Li, all transition metals (Ni, Co, and Al), and B was 1.1:1:0.03. This nickel-excess lithium transition metal oxide was used as a positive electrode active material of Example 2 to prepare a non-aqueous electrolyte secondary battery (test cell A2) as in Example 1.

Example 3

A nickel-excess lithium transition metal oxide that is represented by the composition formula of $Li_{0.97}Ni_{0.88}Co_{0.09}Al_{0.03}O_2$ and to which 0.3 mol % of lithium borate was attached was produced in the same manner as in Example 1 except that LiOH, the composite oxide, and $H_3BO_3$ were mixed in preparation of a positive electrode active material such that the molar ratio of Li, all transition metals (Ni, Co, and Al), and B was 1.15:1:0.03. This nickel-excess lithium transition metal oxide was used as a positive electrode active material of Example 3 to prepare a non-aqueous electrolyte secondary battery (test cell A3) as in Example 1.

Example 4

A nickel-excess lithium transition metal oxide that is represented by the composition formula of $Li_{0.95}Ni_{0.88}Co_{0.09}Al_{0.03}O_2$ and to which 0.5 mol % of lithium borate was attached was produced in the same manner as in Example 1 except that LiOH, the composite oxide, and $H_3BO_3$ were mixed in preparation of a positive electrode active material such that the molar ratio of Li, all transition metals (Ni, Co, and Al), and B was 1.1:1:0.05. This nickel-excess lithium transition metal oxide was used as a positive electrode active material of Example 4 to prepare a non-aqueous electrolyte secondary battery (test cell A4) as in Example 1.

Example 5

A nickel-excess lithium transition metal oxide that is represented by the composition formula of $Li_{0.97}Ni_{0.88}Co_{0.09}Al_{0.03}O_2$ and to which 0.5 mol % of lithium borate was attached was produced in the same manner as in Example 1 except that LiOH, the composite oxide, and $H_3BO_3$ were mixed in preparation of a positive electrode active material such that the molar ratio of Li, all transition metals (Ni, Co, and Al), and B was 1.15:1:0.05. This nickel-excess lithium transition metal oxide was used as a positive electrode active material of Example 5 to prepare a non-aqueous electrolyte secondary battery (test cell A5) as in Example 1.

Comparative Example 1

A nickel-excess lithium transition metal oxide that is represented by the composition formula of $Li_{0.95}Ni_{0.88}Co_{0.09}Al_{0.03}O_2$ was produced in the same manner as in Example 1 except that LiOH, the composite oxide were mixed in the absence of $H_3BO_3$ in preparation of a positive electrode active material such that the ratio of Li and all transition metals (Ni, Co, and Al) was 1.03:1. This nickel-excess lithium transition metal oxide was used as a positive electrode active material of Comparative Example 1 to prepare a non-aqueous electrolyte secondary battery (test cell B1).

Comparative Example 2

A nickel-excess lithium transition metal oxide represented by the composition formula of $Li_{0.98}Ni_{0.88}Co_{0.09}Al_{0.03}O_2$ was produced in Example 1 except that LiOH and the composite oxide were mixed in the absence of $H_3BO_3$ in preparation of a positive electrode active material such that the ratio of Li and all transition metals (Ni, Co, and Al) was 1.1:1. This nickel-excess lithium transition metal oxide was used as a positive electrode active material of Comparative Example 2 to prepare a non-aqueous electrolyte secondary battery (test cell B2).

Comparative Example 3

A nickel-excess lithium transition metal oxide that is represented by the composition formula of $Li_{0.84}Ni_{0.88}Co_{0.09}Al_{0.03}O_2$ and to which 0.5 mol % lithium borate was attached was produced in the same manner as in Example 1 except that LiOH, the composite oxide, and $H_3BO_3$ were mixed in preparation of a positive electrode active material such that the molar ratio of Li, all transition metals (Ni, Co, and Al), and B was 1.03:1:0.05. This nickel-excess lithium transition metal oxide was used as a positive electrode active material of Comparative Example 3 to prepare a non-aqueous electrolyte secondary battery (test cell B3).

FIG. 1 illustrates X-ray diffraction patterns of positive electrode active materials of Example 5 and Comparative Example 1, and enlarged X-ray diffraction patterns from 15° to 50°. Example 5 and Comparative Example 1 each show a diffraction line indicating a layered structure.

Example 5 in which the positive active material is synthesized with addition of $H_3BO_3$ shows, in addition to a diffraction line indicating a layered structure, a diffraction line corresponding to lithium borate from 20° to 35°. As not shown in the figure, the same applies to other Examples and Comparative Examples.

[Measurement of Direct-Current Resistance]

Under a temperature condition of 25° C., the test cells A1 to A5 (Examples 1 to 5) and the test cells B1 to B3 (Comparative Examples 1 to 3) having a battery capacity of about 30 mAh and produced as described above were each charged at a constant current of 3 mA to a predetermined SOC and then charged at a constant voltage until the current reached 0.3 mA. After a 2-hour pause, a current of 6 mA was then passed to the cells for 15 seconds, and a change in voltage at this time was denoted as ΔV. The ΔV value was divided by the current to produce a direct-current resistance.

Table 1 shows a summary of the results of the amount of lithium borate (on a boron element basis), the porosity of secondary particles, and the direct-current resistance in each SOC in Examples and Comparative Examples. The method for determining the porosity of secondary particles is as described above.

TABLE 1

| | Amount of Lithium Borate mol % | Porosity of Secondary Particles % | Direct-Current Resistance at SOC of 10% Ω | Direct-Current Resistance at SOC of 50% Ω |
|---|---|---|---|---|
| Comparative Example 1 | 0 | 1.7 | 0.0192 | 0.0041 |
| Comparative Example 2 | 0 | 1.5 | 0.0185 | 0.0072 |
| Comparative Example 3 | 0.5 | 6.7 | 0.0223 | 0.0050 |
| Example 1 | 0.1 | 2.5 | 0.0160 | 0.0039 |
| Example 2 | 0.3 | 5.6 | 0.0139 | 0.0034 |
| Example 3 | 0.3 | 5.1 | 0.0107 | 0.0029 |
| Example 4 | 0.5 | 5.8 | 0.0111 | 0.0042 |
| Example 5 | 0.5 | 4.3 | 0.0116 | 0.0032 |

Examples 1 to 5 exhibit smaller direct-current resistances than Comparative Examples 1 to 3. These results indicate that the direct-current resistance can be reduced by attaching a predetermined amount of lithium borate to the surfaces of the primary particles of the nickel-excess lithium transition metal oxide and controlling the porosity h of secondary particles in the range of 2%<h<6%.

Examples 3 to 5, among Examples 1 to 5, exhibit smaller direct-current resistances than Examples 1 and 2. Therefore, the proportion b of lithium borate with respect to the total molar amount of metal elements other than lithium in the lithium-nickel composite oxide is more preferably in the range of 0.3 mol %≤b≤0.5 mol % on a boron element basis. The porosity h of the secondary particles is more preferably in the range of 4.3%≤h≤5.8%.

Table 2 shows a summary of the measured values of primary particle size, compression breaking strength, crystallite size, the amount of the transition metal at the 3a site, and lattice constants. The methods for determining each measured value are as described above.

TABLE 2

| | Primary Particle Size nm | Compression Breaking Strength MPa | Crystallite Size Å | Amount of Transition Metal at 3a Site mol % | Lattice Constant a Å | Lattice Constant c Å |
|---|---|---|---|---|---|---|
| Comparative Example 1 | 500-1200 | 114 | 531 | 1.0 | 2.871 | 14.185 |
| Comparative Example 2 | 500-1300 | — | 580 | 0.3 | 2.871 | 14.182 |
| Comparative Example 3 | 100-400 | 68.8 | 374 | 5.4 | 2.875 | 14.199 |
| Example 1 | 500-1200 | 76.4 | 510 | 1.1 | 2.871 | 14.181 |
| Example 2 | 500-1200 | 64.5 | 577 | 1.1 | 2.8706 | 14.185 |
| Example 3 | 500-1300 | 55.9 | 570 | 0.7 | 2.8704 | 14.176 |
| Example 4 | 400-1000 | 80.5 | 465 | 2.5 | 2.8715 | 14.191 |
| Example 5 | 500-1200 | 78.4 | 542 | 1.8 | 2.8702 | 14.184 |

Under a temperature condition of 25° C., the test cells A1 to A5 (Examples 1 to 5) and the test ceils B1 to B3 (Comparative Examples 1 to 3) were each charged at a constant current of 6 mA until the voltage reached 4.3 V, then charged at a constant voltage of 4.3 V until the current reached 1.5 mA, and thereafter discharged at a constant current of 6 mA until the voltage reached 2.5 V. As a result, the charge/discharge capacity of the test cell A4 (Example 4) was slightly smaller than those of other test cells, while the discharge capacity of the test cell B3 (Comparative Example 3) was much larger than those of other test cells. This may be because the amount m of the transition metal present at the 3a site (lithium site) in the crystal structure is not less than 2 mol % with respect to the total molar amount of transition metals, and thus the diffusibility of lithium ions is low due to distortion of the crystal structure, resulting in a low charge/discharge capacity.

The invention claimed is:

1. A positive electrode active material for non-aqueous electrolyte secondary batteries, the positive electrode active material comprising lithium borate and a nickel-containing lithium transition metal oxide (Ni≥80 mol %) having a layered structure,
   wherein the nickel-containing lithium transition metal oxide is composed of secondary particles formed by aggregation of primary particles,
   wherein lithium borate is attached to surfaces of the primary particles, and a proportion b of lithium borate with respect to a total molar amount of metal elements other than lithium in the nickel-containing lithium transition metal oxide is in a range of 0 mol %<b≤0.5 mol % on a boron element basis,
   wherein a porosity h of the secondary particles is in a range of 4.3%≤h≤5.8%,
   wherein a lattice constant a indicating an a-axis length and a lattice constant c indicating a c-axis length of a crystal structure of the nickel-containing lithium transition metal oxide are respectively in a range of 2.867 Å<a<2.873 Å and in a range of 14.17 Å<c<14.19 Å, the crystal structure being determined from analysis results of an X-ray diffraction pattern obtained by X-ray diffraction, and
   wherein boron is dissolved in the nickel-containing lithium transition metal oxide.

2. The positive electrode active material for non-aqueous electrolyte secondary batteries according to claim 1, wherein the primary particles have a diameter R in a range of 400 nm<R<1300 nm.

3. The positive electrode active material for non-aqueous electrolyte secondary batteries according to claim 1, wherein the secondary particles have a compression breaking strength K in a range of 50 MPa<K<150 MPa.

4. The positive electrode active material for non-aqueous electrolyte secondary batteries according to claim 1, wherein a crystallite size s of the nickel-containing lithium transition metal oxide is in a range of 300 Å≤s≤700 Å, the crystallite size s being calculated in accordance with a Scherrer equation from a half-width of a diffraction peak corresponding to a (104) face in an X-ray diffraction pattern obtained by X-ray diffraction.

5. The positive electrode active material for non-aqueous electrolyte secondary batteries according to claim 1, wherein an amount m of a transition metal present at a 3a site in a crystal structure of the nickel-containing lithium transition metal oxide is in a range of 0 mol %≤m<2 mol % with respect to a total molar amount of transition metals, the crystal structure being determined from Rietveld analysis results of an X-ray diffraction pattern obtained by X-ray diffraction.

6. A non-aqueous electrolyte secondary battery comprising a positive electrode and a negative electrode, wherein the positive electrode contains the positive electrode active material for non-aqueous electrolyte secondary batteries according to claim 1.

* * * * *